United States Patent
Shen et al.

(10) Patent No.: US 9,359,469 B2
(45) Date of Patent: Jun. 7, 2016

(54) PHOSPHOR-CONTAINING PHENOL FORMALDEHYDE RESIN AND FLAME-RETARDANT EPOXY RESIN HARDENER CONTAINING THEREOF

(71) Applicant: Jiangsu Yoke Technology Co., Ltd, Jiangsu Province (CN)

(72) Inventors: Qi Shen, Jiangsu Province (CN); Xu-Feng Li, Jiangsu Province (CN); Dong Zhao, Jiangsu Province (CN)

(73) Assignee: Jiangsu Yoke Technology Co., Ltd, Jiangsu Province (CN)

( * ) Notice: Subject to any disclaimer, the term of this patent is extended or adjusted under 35 U.S.C. 154(b) by 73 days.

(21) Appl. No.: 14/312,703

(22) Filed: Jun. 24, 2014

(65) Prior Publication Data

US 2014/0378626 A1    Dec. 25, 2014

(30) Foreign Application Priority Data

Jun. 25, 2013   (CN) .......................... 2013 1 0255770

(51) Int. Cl.
| | |
|---|---|
| *C08G 59/40* | (2006.01) |
| *C08L 63/04* | (2006.01) |
| *C08G 8/24* | (2006.01) |
| *C08G 8/00* | (2006.01) |
| *C08G 14/00* | (2006.01) |
| *C08G 16/00* | (2006.01) |

(52) U.S. Cl.
CPC .............. *C08G 59/4071* (2013.01); *C08G 8/00* (2013.01); *C08G 8/24* (2013.01); *C08G 14/00* (2013.01); *C08G 16/00* (2013.01); *C08L 63/04* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 6,613,848 B1 * | 9/2003 | Wang ................... | C07F 9/3282 525/481 |
| 6,627,704 B2 | 9/2003 | Yeager et al. | |
| 6,797,821 B2 | 9/2004 | Wang | |
| 6,897,282 B2 | 5/2005 | Freshour et al. | |
| 6,992,151 B2 | 1/2006 | Wang et al. | |
| 8,124,716 B2 | 2/2012 | Gan | |
| 8,202,948 B2 | 6/2012 | Gan | |
| 2009/0215967 A1 | 8/2009 | Lin et al. | |
| 2011/0224345 A1 * | 9/2011 | Tzou ................... | C08G 59/621 524/404 |
| 2012/0095156 A1 | 4/2012 | Hayashi et al. | |
| 2012/0172546 A1 | 7/2012 | Tang et al. | |
| 2013/0012668 A1 | 1/2013 | Lin et al. | |

FOREIGN PATENT DOCUMENTS

| | | |
|---|---|---|
| CN | 1960997 A | 5/2007 |
| CN | 102276654 A | 12/2011 |
| CN | 102504475 A | 6/2012 |
| CN | 102504483 A | 6/2012 |
| CN | 102746613 A | 10/2012 |
| DE | 4308184 A1 | 9/1994 |
| DE | 4308185 A1 | 9/1994 |
| DE | 4308187 A1 | 9/1994 |
| EP | 0384939 A1 | 9/1990 |
| EP | 0384940 A1 | 9/1990 |
| EP | 0408990 A2 | 1/1991 |
| JP | 4548547 B1 | 9/2010 |
| JP | 2012012590 A | 1/2012 |
| JP | 2012057058 A | 3/2012 |
| JP | 2013018772 A | 1/2013 |
| JP | 2013170171 A | 9/2013 |
| TW | 201109371 | 3/2011 |
| WO | 9607685 A1 | 3/1996 |
| WO | 9607686 A1 | 3/1996 |
| WO | 0142359 A1 | 6/2001 |
| WO | 2010114279 A2 | 10/2010 |
| WO | 2013063635 A1 | 5/2013 |

OTHER PUBLICATIONS

Xiao Chun-xia, et al.; "Study on the Synthes is of Phosphorous Phenolic Resin and Its Flame Retardance";Chemical World, http://www.cnki.net, Dec. 31, 2008, pp. 719-723.

* cited by examiner

*Primary Examiner* — Randy Gulakowski
*Assistant Examiner* — Christopher M Rodd
(74) *Attorney, Agent, or Firm* — CKC & Partners Co., Ltd.

(57) ABSTRACT

The introduction of environmentally-friendly organic phosphorus group can not only maintain the original excellent properties of epoxy resins, but also meet the high flame-retarding requirements, and have the ability to improve the vitrification temperature (Tg), heat resistance and other characteristics of the material so that the curing system can be successfully applied to the electronic materials field which are light, thin, small and precise, the present disclosure provides a flame-retarding phosphor-containing phenol-formaldehyde novolac and the preparation method thereof, the use of the compound to react with the epoxy group of an epoxy resin to obtain an environmentally-friendly and high performing halogen-free cured flame retarding epoxy resin, and the compound can also be used for curing epoxy resins and gives a high flame-retarding effect.

10 Claims, No Drawings

PHOSPHOR-CONTAINING PHENOL FORMALDEHYDE RESIN AND FLAME-RETARDANT EPOXY RESIN HARDENER CONTAINING THEREOF

RELATED APPLICATIONS

This application claims priority to China Application Serial Number 201310255770.6, filed Jun. 25, 2013, which is herein incorporated by reference.

BACKGROUND

1. Field of Invention

The present disclosure relates to a phosphorous-containing phenol-formaldehyde novolac structure and the preparation method thereof, and the use of the compound to react with the epoxy group of an epoxy resin to obtain an environmentally-friendly and high performing halogen-free cured flame retarding epoxy resin.

2. Description of Related Art

The chemical structure of epoxy resin features its desirable properties, e.g., reactivity, toughness, flexibility, good mechanical properties, electrical properties, dimensional stability, and superior bonding properties for different substrates. The cured epoxy resin can not only maintain the original features of the substrate, but also further block out water, gas and chemicals, and it is also lightweight and low cost. Therefore, epoxy resin is widely used in electronics and aerospace industries, especially in the field of semiconductor packaging material, printed circuit board substrate material and so on. However, when the epoxy resin is applied to a printed circuit board, there is a lack of flame retarding. In the past, halogen based flame-retardant was added to the epoxy resin to meet the flame-retarding requirements. The halogen based flame-retardant will produce dioxin, benzofuran and other irritating and corrosive harmful gases when burnt, and the small molecules of the flame-retardant often cause a reduction in the mechanical properties and will photodecompose, thus causing material deterioration. At the same time, there will be migration and volatility issues, resulting in a reduction of the material performance and the flame-retarding effect is not ideal. Therefore, the use of organic phosphorus compound flame-retardants in thermosetting epoxy resin compositions instead of halogenated flame-retardants is constantly emerging, for example, in patents such as EP A 0384939, EP A 0384940, EP A 0408990, DE A 4308184, DE A 4308185, DE A 4308187, WO A 96/07685, and WO A 96/07686. In addition, for the printed circuit laminates, with the rise of environmental awareness, the current international norms require lead free processes, therefore the processing of the substrate are now more demanding, especially regarding the vitrification temperature (Tg) of the material and the heat resistance of the substrate in a tin furnace has become an important issue that researchers in this field must overcome.

SUMMARY

The present disclosure provides a new type of phosphorous-containing phenol-formaldehyde novolac that can be used for curing epoxy resins, and gives a high flame-retarding effect. The introduction of environmentally-friendly organic phosphorus group can not only maintain the original excellent properties of epoxy resins, but also meet the high flame-retarding requirements, and have the ability to improve the vitrification temperature (Tg), heat resistance and other characteristics of the material, so that the curing system can be successfully applied to the electronic materials field which are light, thin, small and precise.

One aspect of the present disclosure is to provide a new type of phosphorous-containing flame retarding phenol-formaldehyde novolac, a compound with the general formula represented by Formula (I):

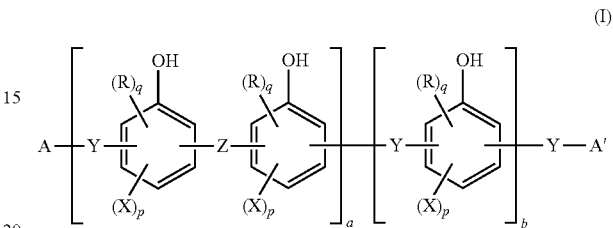

wherein, A and A' are individually

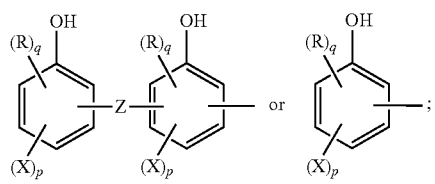

Y is —$CH_2$— or —$CH_2$—O—$CH_2$—, and Y in different units are the same or different;

Z is unsubstituted, —$CH_2$—, —$C(CH_3)_2$—, —O—, —S— or —$S(O)_2$—, and Z in different units are the same or different;

R is H, a C1-C10 alkyl group, a C6-C18 aromatic group,

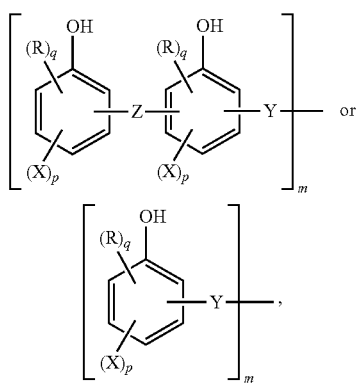

and R in different units are the same or different;

p is 0-2;

q is 0-3;

a is an integer greater than or equal to 1;

b is an integer greater than or equal to 1;

m is 0-6;

X is

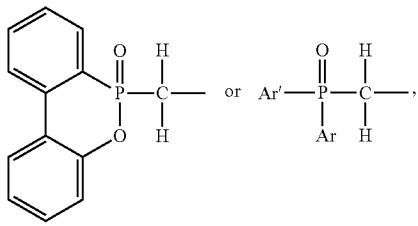

wherein Ar and Ar' are individually

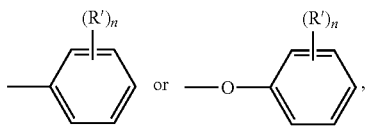

R' is H, a C1-C4 alkyl group or a C6-C18 aromatic group, and R' in different units are the same or different; and n is 0-5.

The above mentioned phosphorous-containing flame retarding phenol-formaldehyde novolac compound have a suitable reactivity, wide range of lamination processing period, high vitrification temperature, excellent heat resistance, low water absorption, good electrical properties and can be used as an epoxy resin hardener, by reacting the epoxy group of the epoxy resin with the phenolic hydroxyl group of the compound, an environmentally-friendly halogen-free cured flame retarding epoxy resin may be formed, which can be used in packaging materials for integrated circuit boards and semiconductors.

The preparation method of the above mentioned phosphorous-containing flame retarding phenol-formaldehyde novolac is carried out by synthesizing a phenol-formaldehyde novolac by using a phenol compound, bisphenol compound and formaldehyde, the phenol-formaldehyde novolac is then mixed with an aromatic phosphate ester (i.e., the X in Formula I) to undergo a condensation polymerization reaction to produce the product.

The above mentioned phosphorous-containing flame retarding phenol-formaldehyde novolac includes a phenol compound and a bisphenol compound, wherein the mass ratio of the phenol compound and the bisphenol compound is between 1:0.1 to 1:9.

The phenol compounds used in the preparation method of the present disclosure may be phenol, o-cresol, m-cresol, p-cresol, o-phenylphenol, m-phenylphenol, p-phenylphenol, 2,6-dimethylphenol, 2,4-dimethylphenol and the combination thereof; the bisphenol compound may be biphenol, bisphenol F, bisphenol A, p-thiobisphenol, bisphenol S and the combination thereof; the aromatic phosphate ester may be DOPO (9,10-dihydro-9-oxa-10-phosphaphenanthrene-10-oxide), diphenyl phosphite ester, diphenyl phosphonate, and C1-C4 alkyl group or C6-C18 aromatic group substituted thereof and the combination thereof.

The above mentioned phosphorous-containing phenol-formaldehyde novolac can be used as the epoxy resin hardener. In the chemical structure, since the phosphorous-containing phenol-formaldehyde novolac, in addition to having a phenol compound, has an bisphenol compound with excellent heat resistance, high vitrification temperature (Tg), low water absorption and good electrical properties, examples of the bisphenol compound include biphenol, bisphenol F, bisphenol A and bisphenol S, etc. Therefore, the drawbacks of lack of flexibility and insufficient heat resistance when the phenol compound is used alone can be compensated. On the other hand, through mixing of the bisphenol compound and the phenol compound, the drawbacks of the high coefficient of expansion when the temperature is greater than the vitrification temperature (Tg) of the cured product can be effectively improved (compared to using the bisphenol A alone), this can help improve the dimensional stability of the product, which can be applied to the electronic materials field which are light, thin, small and precise.

The present disclosure also provides a cured flame retarding epoxy resin, which is prepared by reacting the above-mentioned phosphorous-containing flame retarding phenol-formaldehyde novolac, which can be used alone or mixed with conventional epoxy resin hardeners, with epoxy resin at high temperatures. The halogen-free flame retarding epoxy resin composition was impregnated in glass fiber, and then after thermosetting, forms a flame retarding copper-clad laminate, which can be used as a packaging material in integrated circuit boards and semiconductors, the cured flame retarding epoxy resin that is formed can be used as a resin substrate of a printed circuit board and semiconductor packaging material.

The conventional epoxy resin hardener mentioned above can be selected from the group consisting of phenol-formaldehyde novolac, cresol-formaldehyde novolac, bisphenol A phenol-formaldehyde novolac, dicyandiamide, methylenedianiline, diaminodiphenyl sulfone and the combination thereof.

The above mentioned epoxy resin refers to a difunctional epoxy resin or a polyfunctional epoxy resin, for example, bisphenol A novolac epoxy, bisphenol F novolac epoxy, bisphenol S novolac epoxy, biphenol novolac epoxy, phenol novolac epoxy, cresol novolac epoxy, bisphenol A novolac epoxy and the combination thereof.

The cured phosphorous-containing flame retarding epoxy resin in the present disclosure, wherein the epoxy resin and the hardener are used in same equivalents, and prepared by a curing reaction at a temperature higher than 150° C.

In order to achieve a UL94 V-0 grade flame-retardant, the cured phosphorous-containing flame retarding epoxy resin (epoxy resin+phosphorous-containing hardener+other additives) of the present disclosure, although the formulation of the compositions and the specific structure of each component have many variations, but as long as the phosphorus content of the final cured product is controlled to be within 0.5 to 10% mass range it is acceptable.

To carry out the reaction effectively, the cured phosphorous-containing flame retarding epoxy resin of the present disclosure can be carried out in the presence of a curing accelerator, a curing accelerator can be used in a range of 0.01 to 2.5 weight percent of the total weight of the epoxy resin and the hardener, and the suitable curing accelerators include imidazole compounds, for example, 2-methylimidazole (2-MI), 2-phenylimidazole (2-PI) or 2-ethyl-4-methylimidazole (2E4MZ) and the like.

These and other features, aspects, and advantages of the present invention will become better understood with reference to the following description and appended claims.

It is to be understood that both the foregoing general description and the following detailed description are by examples, and are intended to provide further explanation of the invention as claimed.

DETAILED DESCRIPTION

Reference will now be made in detail to the present embodiments of the invention. Wherever possible, the same reference numbers are used in the description to refer to the same or like parts.

Preparation of the Phosphorous-Containing Phenol-Formaldehyde Novolac Compound

Embodiment 1

260 grams of phenol, 260 grams of bisphenol A, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-1 is then obtained.

Embodiment 2

52 grams of phenol, 468 grams of bisphenol A, 648 grams of formaldehyde aqueous solution (37% mass concentration) and 24 grams of sodium hydroxide were added to a reactor, the mixing is then started and the temperature is heated to 45° C. and maintained for 3 hours. The temperature is then raised to 68° C., after maintaining the temperature for 3 hours, 1480 grams of n-butanol were added and refluxed for 15 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 130° C., the pressure of the reaction system was reduced to ensure that the n-butanol can be discharged out of the reaction system in time. The temperature is maintained at 180° C. for 1 hour, the reaction temperature is then lowered to 140° C., about 900 grams of propylene glycol methyl ether were added and mixed for another 0.5 hours, a phosphorus based hardener P-2 is then obtained.

Embodiment 3

400 grams of phenol, 68 grams of o-cresol, 52 grams of bisphenol A, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 15 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 120° C., about 900 grams of propylene glycol methyl ether were added and mixed for another 0.5 hours, a phosphorus based hardener P-3 is then obtained.

Embodiment 4

157.6 grams of phenol, 362.4 grams of bisphenol S, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 130° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-4 is then obtained.

Embodiment 5

59 grams of phenol, 461 grams of bisphenol S, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-5 is then obtained.

Embodiment 6

400 grams of phenol, 61 grams of o-cresol, 59 grams of bisphenol S, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 135 t, about 900 grams of propylene glycol methyl ether were added and mixed for another 0.5 hours, a phosphorus based hardener P-6 is then obtained.

Embodiment 7

245 grams of phenol, 245 grams of bisphenol F, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 2 hours, the reaction temperature is then lowered to 130° C., about 900 grams of propylene glycol methyl ether were added and mixed for another 0.5 hours, a phosphorus based hardener P-7 is then obtained.

Embodiment 8

49 grams of phenol, 441 grams of p-thiobisphenol, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 175° C. within a 2 hour period, when the temperature reaches 120° C., the pressure of the reaction system was reduced to ensure that the n-butanol can be discharged out of the reaction system in time. The temperature is maintained at 175° C. for 2 hours, the reaction temperature is then lowered to 140° C., about 900 grams of propylene glycol methyl ether were added and mixed for another 0.5 hours, a phosphorus based hardener P-8 is then obtained.

Embodiment 9

400 grams of phenol, 72.7 grams of 2,6-dimethylphenol, 47.3 grams of bisphenol F, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 150° C., about 900 grams of propylene glycol methyl ether were added and mixed for another 0.5 hours, a phosphorus based hardener P-9 is then obtained.

Embodiment 10

184 grams of phenol, 184 grams of bisphenol A, 184 grams of bisphenol S, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-10 is then obtained.

Embodiment 11

91.2 grams of phenol, 214.4 grams of bisphenol A, 214.4 grams of bisphenol F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 175° C. within a 2 hour period, when the temperature reaches 120° C., the pressure of the reaction system was reduced to ensure that the n-butanol can be discharged out of the reaction system in time. The temperature is maintained at 175° C. for 2 hours, the reaction temperature is then lowered to 130° C., about 900 grams of propylene glycol methyl ether were added and mixed for another 0.5 hours, a phosphorus based hardener P-11 is then obtained.

Embodiment 12

133.5 grams of phenol, 133.5 grams of bisphenol S, 267 grams of bisphenol F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 135° C., about 900 grams of propylene glycol methyl ether were added and mixed for another 0.5 hours, a phosphorus based hardener P-12 is then obtained.

Embodiment 13

468 grams of phenol, 52 grams of bisphenol A, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1040 grams of diphenyl phosphonate were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-13 is then obtained.

Embodiment 14

260 grams of phenol, 260 grams of biphenol, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1010 grams of diphenyl phosphonate were added to the intermediate product, the reaction temperature was raised from 80° C. to 190° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 135° C., about 900 grams of propylene glycol methyl ether were added and mixed for another 0.5 hours, a phosphorus based hardener P-14 is then obtained.

Embodiment 16

148.6 grams of phenol, 371.4 grams of bisphenol F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1010 grams of diphenyl phosphonate were added to the intermediate product, the reaction temperature was raised from 80° C. to 190° C. within a 2 hour period, when the temperature reaches 150° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-15 is then obtained.

Embodiment 16

120.9 grams of phenol, 399.1 grams of bisphenol S, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1010 grams of diphenyl phosphonate were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-16 is then obtained.

Embodiment 17

468 grams of phenol, 52 grams of bisphenol A, 648 grams of formaldehyde aqueous solution (37% mass concentration)

and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1170 grams of diphenyl phosphite ester were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-17 is then obtained.

Embodiment 18

52 grams of phenol, 260 grams of bisphenol A, 104 grams of bisphenol F, 104 grams of biphenol, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1170 grams of bis-p-methylphenyl phosphite ester were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-18 is then obtained.

Embodiment 19

76.5 grams of phenol, 443.5 grams of bisphenol F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1170 grams of diphenyl phosphite ester were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-19 is then obtained.

Embodiment 20

74.3 grams of phenol, 445.7 grams of bisphenol S, 648 grams of formaldehyde aqueous solution (37% mass concentration) and 24 grams of sodium hydroxide were added to a reactor, the mixing is then started and the temperature is heated to 45° C. and maintained for 2 hours. The temperature is then raised to 60° C., after maintaining the temperature for 3 hours, 1480 grams of n-butanol were added and refluxed for 14 hours. The reaction temperature is then lowered to 55-60° C., and distilled under a reduced pressure to remove about 1000 grams of n-butanol, and an intermediate product is obtained.

500 grams of DOPO, 300 grams of diphenyl phosphite ester, 370 grams of diphenyl phosphonate were added to the intermediate product, the reaction temperature was raised from 80° C. to 190° C. within a 2 hour period, when the temperature reaches 150° C., the pressure of the reaction system was reduced to ensure that the n-butanol can be discharged out of the reaction system in time. The temperature is maintained at 180° C. for 2 hours, the reaction temperature is then lowered to 135° C., about 900 grams of propylene glycol methyl ether were added and mixed for another 0.5 hours, a phosphorus based hardener P-20 is then obtained.

Comparative Example 1

470 grams of phenol, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-21 is then obtained.

Comparative Example 2

570 grams of bisphenol A, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2 hour period, when the temperature reaches 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphorus based hardener P-22 is then obtained.

Table of the reactant ratio:

| | Phenol:bisphenol | Phenol compound | Bisphenol compound | Aromatic phosphate ester (i.e., the X in Formula I) | Phosphorus based hardener product |
|---|---|---|---|---|---|
| Embodiment 1 | 1:1 | phenol | bisphenol A | DOPO | P-1 |
| Embodiment 2 | 1:9 | phenol | bisphenol A | DOPO | P-2 |
| Embodiment 3 | 1:0.1 | phenol + o-cresol | bisphenol A | DOPO | P-3 |
| Embodiment 4 | 1:2.3 | phenol | bisphenol S | DOPO | P-4 |
| Embodiment 5 | 1:7.8 | phenol | bisphenol S | DOPO | P-5 |
| Embodiment 6 | 1:0.13 | phenol + o-phenyl phenol | bisphenol S | DOPO | P-6 |
| Embodiment 7 | 1:1 | phenol | bisphenol F | DOPO | P-7 |
| Embodiment 8 | 1:9 | phenol | p-thiobisphenol | DOPO | P-8 |
| Embodiment 9 | 1:0.1 | phenol + 2,6-dimethyl phenol | bisphenol F | DOPO | P-9 |
| Embodiment 10 | 1:2 | phenol | bisphenol A + bisphenol S | DOPO | P-10 |
| Embodiment 11 | 1:4.7 | phenol | bisphenol A + bisphenol F | DOPO | P-11 |
| Embodiment 12 | 1:3 | phenol | bisphenol S + bisphenol F | DOPO | P-12 |
| Embodiment 13 | 1:0.1 | phenol | bisphenol A | diphenyl phosphonate | P-13 |
| Embodiment 14 | 1:1 | phenol | biphenol | diphenyl phosphonate | P-14 |
| Embodiment 15 | 1:2.5 | phenol | bisphenol F | diphenyl phosphonate | P-15 |
| Embodiment 16 | 1:3.3 | phenol | bisphenol S | Diphenyl phosphonate | P-16 |
| Embodiment 17 | 1:0.1 | m-cresol | bisphenol A | diphenyl phosphite ester | P-17 |
| Embodiment 18 | 1:9 | phenol | bisphenol A + bisphenol F + biphenol | di-p-methyl phenyl phosphate ester | P-18 |
| Embodiment 19 | 1:5.8 | phenol | bisphenol F | DOPO + diphenyl phosphite ester | P-19 |
| Embodiment 20 | 1:6 | m-phenyl phenol | bisphenol S | DOPO + diphenyl phosphonate + diphenyl phosphite ester | P-20 |
| Comparative Example 1 | | phenol | | DOPO | P-21 |
| Comparative Example 2 | | | bisphenol A | DOPO | P-22 |

Complete Curing of Epoxy Resin with Phosphorous-Containing Hardener

Embodiment 21-40

Using different phosphorous-containing hardeners (P-1 to P-20) as hardeners for bisphenol A novolac epoxy resin (BNE). The bisphenol A novolac epoxy resin (BNE) is mixed with the hardeners (P-1 to P-20) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm$^2$ for 1 hour, then heated at 170° C. for 2 hours, and then heated at 200° C. for 3 hours to obtain the cured product.

Comparative Example 3

Using the phosphorous-containing hardener in comparative example 1 (P-21) as the hardener for bisphenol A novolac epoxy resin (BNE). The bisphenol A novolac epoxy resin (BNE) is mixed with the hardener (P-21) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm$^2$ for 1 hour, then heated at 170° C. for 2 hours, and then heated at 200° C. for 3 hours to obtain the cured product.

Comparative Example 4

Using the phosphorous-containing hardener in comparative example 2 (P-22) as the hardener for bisphenol A novolac epoxy resin (BNE). The bisphenol A novolac epoxy resin (BNE) is mixed with the hardener (P-22) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm² for 1 hour, then heated at 170° C. for 2 hours, and then heated at 200° C. for 3 hours to obtain the cured product.

Embodiment 41-74

The phosphorous-containing hardener (P-1 to P-22), conventional hardener, bisphenol A novolac epoxy resin (BNE), cresol formaldehyde novolac epoxy resin (CNE), and phenol novolac epoxy (PNE) are in weight proportions shown in table 3, and aluminum hydroxide, silicon dioxide, and imidazole based curing accelerator are mixed homogeneously in a suitable solvent, impregnated with glass fiber cloth in a impregnation machine, after heating at 170 t for 150 seconds, a small heat press was used to cut at 185° C., 25 kg/cm² and cure for 2 hours to obtain a halogen free copper clad laminate.

Comparative Example 5-6

The hardener (P-21 to P-22), bisphenol A novolac epoxy resin (BNE), cresol formaldehyde novolac epoxy resin (CNE), and phenol novolac epoxy (PNE) are in weight proportions shown in table 3, and aluminum hydroxide, silicon dioxide, and imidazole based curing accelerator are mixed homogeneously in a suitable solvent, impregnated with glass fiber cloth in a impregnation machine, after heating at 170° C. for 150 seconds, a small heat press was used to cut at 185° C., 25 kg/cm² and cure for 2 hours to obtain a halogen free copper dad laminate.

Test Description
(1) Varnish Gel Time (Sec)
0.3 ml of resin varnish was placed on a 170° C. hot plate, and the gel time was measured.
(2) Vitrification Temperature (° C.)
A heating rate of 20° C./min was used in differential scanning calorimetry (DSC) tests.
(3) Flame-Retarding:
Test pieces were cut into 0.5 in×4.7 in rectangles, a blue flame with a flame height of 2 cm was used to burn for 10 seconds and then removed, after burning twice, the flame is removed and the self-extinguishing time is recorded.
(4) Water Absorption Rate (%):
The sample was heated in a pressure boiler at 120° C. and 2 atm for 30 minutes.
(5) Dielectric Loss (1 GHz):
The test piece was cut into 5×5 squares, and the thickness were measured by measuring three points and then sandwiched into a dielectric analysis instrument for measurements, after completion, the mean value was recorded.
(6) Dielectric Constant (1 GHz):
The substrate after etching was cut into 5 cm² square test pieces, after baking at 105 t for 2 hours in the oven, the substrate was removed and the thickness were measured by measuring three points. Then the test piece was sandwiched into a dielectric analysis instrument, after measuring three points, the mean value was recorded.

Although the present invention has been described in considerable detail with reference to certain embodiments thereof, other embodiments are possible. Therefore, the spirit and scope of the appended claims should not be limited to the description of the embodiments contained herein.

Table 1 is a comparison of the vitrification temperature (Tg) of the hardeners; Table 2 is an analysis of the thermal cracking of the hardeners; Table 3 gives the test results of the copper-clad laminate substrates.

TABLE 1 vitrification temperature of the cured product.

| Sample | Hardener | Vitrification temperature (Tg, ° C.) |
|---|---|---|
| Embodiment 21 | P-1 | 169 |
| Embodiment 22 | P-2 | 175 |
| Embodiment 23 | P-3 | 162 |
| Embodiment 24 | P-4 | 175 |
| Embodiment 25 | P-5 | 186 |
| Embodiment 26 | P-6 | 165 |
| Embodiment 27 | P-7 | 168 |
| Embodiment 28 | P-8 | 174 |
| Embodiment 29 | P-9 | 161 |
| Embodiment 30 | P-10 | 180 |
| Embodiment 31 | P-11 | 170 |
| Embodiment 32 | P-12 | 175 |
| Embodiment 33 | P-13 | 160 |
| Embodiment 34 | P-14 | 166 |
| Embodiment 35 | P-15 | 165 |
| Embodiment 36 | P-16 | 170 |
| Embodiment 37 | P-17 | 159 |
| Embodiment 38 | P-18 | 165 |
| Embodiment 39 | P-19 | 163 |
| Embodiment 40 | P-20 | 169 |
| Comparative Example 3 | P-21 | 161 |
| Comparative Example 4 | P-22 | 176 |

TABLE 2 analysis of the thermal cracking of the cured product.

| Sample | Hardener | Thermal cracking (5% weight loss) Temp. (° C.) |
|---|---|---|
| Embodiment 21 | P-1 | 366 |
| Embodiment 22 | P-2 | 376 |
| Embodiment 23 | P-3 | 351 |
| Embodiment 24 | P-4 | 386 |
| Embodiment 25 | P-5 | 425 |
| Embodiment 26 | P-6 | 362 |
| Embodiment 27 | P-7 | 366 |
| Embodiment 28 | P-8 | 375 |
| Embodiment 29 | P-9 | 352 |
| Embodiment 30 | P-10 | 378 |
| Embodiment 31 | P-11 | 372 |
| Embodiment 32 | P-12 | 373 |
| Embodiment 33 | P-13 | 345 |
| Embodiment 34 | P-14 | 341 |
| Embodiment 35 | P-15 | 335 |
| Embodiment 36 | P-16 | 380 |
| Embodiment 37 | P-17 | 345 |
| Embodiment 38 | P-18 | 347 |
| Embodiment 39 | P-19 | 337 |
| Embodiment 40 | P-20 | 380 |
| Comparative Example 3 | P-21 | 338 |
| Comparative Example 4 | P-22 | 353 |

TABLE 3 resin composition formulation and physical properties.

| | Embodiment | | | | | | | | | | | |
|---|---|---|---|---|---|---|---|---|---|---|---|---|
| | 41 | 42 | 43 | 44 | 45 | 46 | 47 | 48 | 49 | 50 | 51 | 52 |
| BNE | 35 | 35 | 35 | 20 | 20 | 20 | 30 | 30 | 25 | 20 | 20 | 20 |
| PNE | 10 | 10 | 10 | 10 | 10 | 10 | 0 | 0 | 5 | 10 | 10 | 10 |
| CNE | 55 | 55 | 55 | 70 | 70 | 70 | 70 | 70 | 70 | 70 | 70 | 70 |
| P-1 | 17 | | | | | | | | | | | |
| P-2 | | 18 | | | | | | | | | | |
| P-3 | | | 18 | | | | | | | | | |
| P-4 | | | | 16 | | | | | | | | |
| P-5 | | | | | 16 | | | | | | | |
| P-6 | | | | | | 17 | | | | | | |
| P-7 | | | | | | | 19 | | | | | |
| P-8 | | | | | | | | 17 | | | | |
| P-9 | | | | | | | | | 19 | | | |
| P-10 | | | | | | | | | | 17 | | |
| P-11 | | | | | | | | | | | 18 | |
| P-12 | | | | | | | | | | | | 19 |
| Conventional epoxy resin hardener | — | — | — | — | — | — | — | — | — | — | — | — |
| Flame retardant (Aluminum hydroxide) | 20 | 20 | 20 | 20 | 20 | 20 | 20 | 20 | 20 | 20 | 20 | 20 |
| Filler (silicon dioxide) | 10 | 10 | 10 | 10 | 10 | 10 | 10 | 10 | 10 | 10 | 10 | 10 |
| Accelerator 2MI (PHR) | | | | 1.1 | 1.2 | 1.4 | | | | 1.1 | 1.2 | 1.2 |
| Accelerator 2PI (PHR) | 0.2 | 0.2 | 0.3 | | | | 0.5 | 0.6 | 0.7 | | | |
| Phosphorus content (%) | 1.20 | 1.30 | 1.30 | 1.16 | 1.16 | 1.20 | 1.35 | 1.24 | 1.33 | 1.25 | 1.35 | 1.41 |
| Gel Time (sec) | 360 | 354 | 350 | 360 | 355 | 348 | 365 | 355 | 361 | 340 | 362 | 360 |
| Vitrification temperature (° C.) | 170 | 175 | 161 | 180 | 192 | 172 | 168 | 174 | 160 | 178 | 170 | 173 |
| Flame resistance | 94 V-0 | 94 V-0 | 94 V-0 | 94 V-0 | 94 V-0 | 94 V-0 | 94 V-0 | 94 V-0 | 94 V-0 | 94 V-0 | 94 V-0 | 94 V-0 |
| Thermal coefficient of expansion (α1/α2) | 40/238 | 48/243 | 42/235 | 38/213 | 31/201 | 38/218 | 40/232 | 43/235 | 41/232 | 35/220 | 40/225 | 37/224 |
| Water absorption rate (%) | 0.12 | 0.15 | 0.16 | 0.13 | 0.16 | 0.18 | 0.15 | 0.17 | 0.18 | 0.15 | 0.17 | 0.18 |
| Dielectric constant (1 GHz) | 4.21 | 4.20 | 4.23 | 4.00 | 4.05 | 4.02 | 4.15 | 4.15 | 4.15 | 4.13 | 4.19 | 4.11 |
| Dielectric loss (1 GHz) | 0.011 | 0.012 | 0.012 | 0.009 | 0.009 | 0.011 | 0.011 | 0.012 | 0.011 | 0.013 | 0.014 | 0.013 |

| | Embodiment | | | | | | | | | | | |
|---|---|---|---|---|---|---|---|---|---|---|---|---|
| | 53 | 54 | 55 | 56 | 57 | 58 | 59 | 60 | 61 | 62 | 63 | 64 |
| BNE | 10 | 10 | 10 | 10 | 15 | 15 | 15 | 15 | 100 | 0 | 35 | 35 |
| PNE | 20 | 20 | 20 | 20 | 15 | 15 | 15 | 15 | 0 | 0 | 10 | 10 |
| CNE | 70 | 70 | 70 | 70 | 70 | 70 | 70 | 70 | 0 | 100 | 55 | 55 |
| P-13 | 18 | | | | | | | | | | | |
| P-14 | | 17 | | | | | | | | | | |
| P-15 | | | 18 | | | | | | | | | |
| P-16 | | | | 19 | | | | | | | | |
| P-17 | | | | | 20 | | | | | | | |
| P-18 | | | | | | 20 | | | | | | |
| P-19 | | | | | | | 21 | | | | | |
| P-20 | | | | | | | | 20 | | | | |
| P-1 | | | | | | | | | 17 | | | |
| P-4 | | | | | | | | | | 18 | | |
| P-6 | | | | | | | | | | | 17 | |
| P-10 | | | | | | | | | | | | 17 |
| Conventional epoxy resin hardener | — | — | — | — | — | — | — | — | — | — | — | — |

TABLE 3-continued resin composition formulation and physical properties.

| | | | | | | | | | | | | |
|---|---|---|---|---|---|---|---|---|---|---|---|---|
| Flame retardant (Aluminum hydroxide) | 20 | 20 | 20 | 20 | 20 | 20 | 20 | 20 | 20 | 20 | 20 | 20 |
| Filler (silicon dioxide) | 10 | 10 | 10 | 10 | 10 | 10 | 10 | 10 | 10 | 10 | 10 | 10 |
| Accelerator 2E4MZ(PHR) | | | | | 1.9 | 2.0 | 2.0 | 2.1 | | 1.0 | | |
| Accelerator 2PI(PHR) | 1.5 | 1.8 | 1.8 | 1.8 | | | | | 0.5 | | 0.01 | 0.03 |
| Phosphorus content (%) | 1.42 | 1.45 | 1.45 | 1.42 | 1.44 | 1.43 | 1.44 | 1.45 | 1.20 | 1.25 | 1.20 | 1.20 |
| Gel Time (sec) | 340 | 335 | 333 | 331 | 321 | 320 | 315 | 312 | 365 | 355 | 347 | 364 |
| Vitrification temperature (° C.) | 163 | 168 | 165 | 176 | 162 | 166 | 164 | 176 | 175 | 188 | 156 | 174 |
| Flame resistance | 94 V-0 | 94 V-0 | 94 V-0 | 94 V-0 | 94 V-0 | 94 V-0 | 94 V-0 | 94 V-0 | 94 V-0 | 94 V-0 | 94 V-0 | 94 V-0 |
| Thermal coefficient of expansion (α1/α2) | 49/220 | 48/221 | 49/220 | 48/240 | 49/245 | 50/252 | 50/244 | 51/240 | 45/240 | 34/218 | 42/232 | 52/236 |
| Water absorption rate (%) | 0.17 | 0.18 | 0.17 | 0.16 | 0.17 | 0.17 | 0.16 | 0.16 | 0.12 | 0.10 | 0.12 | 0.13 |
| Dielectric constant (1 GHz) | 4.31 | 4.32 | 4.31 | 4.32 | 4.42 | 4.45 | 4.51 | 4.46 | 4.18 | 4.00 | 4.21 | 4.22 |
| Dielectric loss (1 GHz) | 0.015 | 0.015 | 0.014 | 0.014 | 0.018 | 0.018 | 0.017 | 0.018 | 0.011 | 0.009 | 0.009 | 0.012 |

| | Embodiment | | | | | | | | | | Comp. Ex. 5 | Comp. Ex. 6 |
|---|---|---|---|---|---|---|---|---|---|---|---|---|
| | 65 | 66 | 67 | 68 | 69 | 70 | 71 | 72 | 73 | 74 | | |
| BNE | 10 | 10 | 10 | 10 | 15 | 15 | 15 | 15 | 100 | 0 | 35 | 35 |
| PNE | 20 | 20 | 20 | 20 | 15 | 15 | 15 | 15 | 0 | 0 | 10 | 10 |
| CNE | 70 | 70 | 70 | 70 | 70 | 70 | 70 | 70 | 0 | 100 | 55 | 55 |
| P-13 | 18 | | | | | | | | | | | |
| P-14 | | 17 | | | | | | | | | | |
| P-15 | | | 18 | | | | | | | | | |
| P-16 | | | | 19 | | | | | | | | |
| P-17 | | | | | 17 | | | | | | | |
| P-18 | | | | | | 17 | | | | | | |
| P-19 | | | | | | | 18 | | | | | |
| P-20 | | | | | | | | 19 | | | | |
| P-1 | | | | | | | | | 17 | | | |
| P-4 | | | | | | | | | | 18 | | |
| P-21 | | | | | | | | | | | 17 | |
| P-22 | | | | | | | | | | | | 17 |
| Conventional epoxy resin hardener | — | — | — | — | 3-(phenol-formal-dehyde novolac) | 3-(methylene dianiline) | 2-(cresol-formal-dehyde novolac) + 1-(bisphenol A phenol formal-dehyde novolac) | 1-(diamino diphenyl sulfone) | — | — | — | — |
| Flame retardant (Aluminum hydroxide) | 20 | 20 | 20 | 20 | 20 | 20 | 20 | 20 | 20 | 20 | 20 | 20 |
| Filler (silicon dioxide) | 10 | 10 | 10 | 10 | 10 | 10 | 10 | 10 | 10 | 10 | 10 | 10 |
| Accelerator 2E4MZ(PHR) | | | | | 0.02 | 0.5 | 1.2 | 1.8 | | 2.5 | | |
| Accelerator 2PI(PHR) | 0.6 | 1.1 | 1.9 | 2.1 | | | | | 2.5 | | 0.2 | 0.2 |
| Phosphorus content (%) | 1.41 | 1.44 | 1.45 | 1.43 | 1.44 | 1.42 | 1.43 | 1.45 | 1.21 | 1.24 | 1.20 | 1.20 |

TABLE 3-continued resin composition formulation and physical properties.

| | | | | | | | | | | | | |
|---|---|---|---|---|---|---|---|---|---|---|---|---|
| Gel Time (sec) | 339 | 338 | 332 | 334 | 323 | 321 | 315 | 311 | 363 | 354 | 350 | 365 |
| Vitrification temperature (° C.) | 162 | 167 | 166 | 177 | 164 | 163 | 168 | 175 | 173 | 187 | 155 | 176 |
| Flame resistance | 94 V-0 | 94 V-0 | 94 V-0 | 94 V-0 | 94 V-0 | 94 V-0 | 94 V-0 | 94 V-0 | 94 V-0 | 94 V-0 | 94 V-0 | 94 V-0 |
| Thermal coefficient of expansion (α1/α2) | 49/221 | 48/222 | 49/220 | 48/239 | 49/243 | 50/253 | 50/246 | 51/242 | 45/240 | 34/219 | 42/238 | 52/255 |
| Water absorption rate (%) | 0.16 | 0.18 | 0.18 | 0.17 | 0.16 | 0.17 | 0.17 | 0.18 | 0.13 | 0.11 | 0.12 | 0.12 |
| Dielectric constant (1 GHz) | 4.32 | 4.33 | 4.33 | 4.32 | 4.41 | 4.43 | 4.49 | 4.44 | 4.19 | 4.04 | 4.25 | 4.21 |
| Dielectric loss (1 GHz) | 0.014 | 0.015 | 0.016 | 0.015 | 0.018 | 0.017 | 0.017 | 0.019 | 0.012 | 0.010 | 0.011 | 0.011 |

Comparing the Tg (Table 1) of the cured products obtained in embodiments 21-40 and comparative example 3-4, we can see that the cured phosphorous-containing epoxy resin of the present disclosure, especially the cured phosphorous-containing epoxy resin prepared by using a hardener obtained by using bisphenol S and phenol as the raw materials (embodiment 5; hardener P-5) and then reacting with epoxy resin, the Tg is higher than the cured phosphorous-containing epoxy resin prepared by using phenol, and even 10° C. higher than the cured epoxy resin prepared by using bisphenol A based phosphorous-containing hardener, and the thermal stability is better than the other embodiments. The use of other phosphate ester compounds in the preparation, and DOPO based hardener also showed good results.

From Table 2 we can see the differences in the degree of crosslinking of the phosphorus based hardener and the epoxy resin, wherein in the TGA tests of the bisphenol S based phosphorous-containing epoxy resin hardener (embodiment 5; hardener P-5), the thermal cracking (5% weight loss) temperature can exceed 400° C., and can be used as high-end electronic packaging materials.

From Table 3 we can seen that the Tg of the cured phosphorous-containing epoxy resin of the present disclosure is higher than the phosphorous-containing hardener prepared by using only phenol (comparative example 1; P-21), and the cured phosphorous-containing epoxy resin containing bisphenol S (embodiment 44-46) showed better electrical properties than comparative example 5 and comparative example 6. the DK can reach 4.0 and the Df can reach 0.009. In terms of the performance of the coefficient of expansion, the α1 in embodiments 44-46 are between 30 and 40, and α2 is between 200 and 220. In embodiment 41-74, as long as a phosphorus content of 1.1-1.5% is in the formulation, the copper-clad laminate can meet the requirement of flame-retarding effect, therefore making it ideal to be used in the field of manufacturing high-end phosphor-containing copper-clad laminate materials.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A phosphorous-containing flame retarding phenol-formaldehyde novolac, comprising a compound with the general formula represented by formula (I):

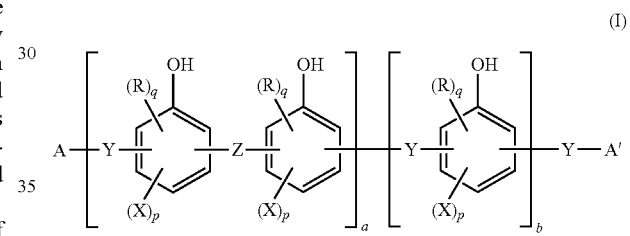

wherein A and A' are individually

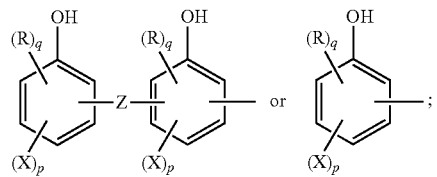

Y is —CH$_2$— or —CH$_2$—O—CH$_2$—, and Y in different units are the same or different;

Z is —CH$_2$—, —C(CH$_3$)$_2$—, —O—, —S— or —S(O)$_2$—, and Z in different units are the same or different, wherein Z is different from Y;

R is H, a C1-C10 alkyl group, a C6-C18 aromatic group,

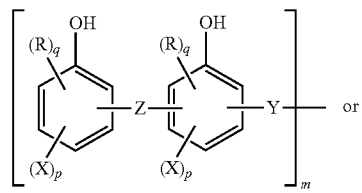

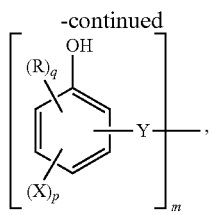

and R in different units are the same or different;
p is 0-2;
q is 0-3;
a is an integer greater than or equal to 1;
b is an integer greater than or equal to 1;
m is 0-6;
X is

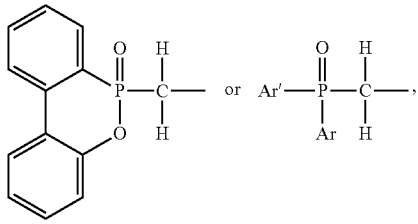

wherein Ar and Ar' are individually

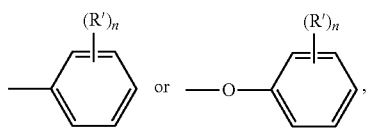

R' is H, a C1-C4 alkyl group or a C6-C18 aromatic group, and R' in different units are the same or different; and
n is 0-5.

2. A method of producing a phosphorous-containing flame retarding phenol-formaldehyde novolac, comprising:
mixing a phenol compound, a bisphenol compound and a formaldehyde to synthesize a phenol-formaldehyde novolac, wherein the phenol compound is selected from the group consisting of phenol, o-cresol, m-cresol, p-cresol, o-phenylphenol, m-phenylphenol, p-phenylphenol, 2,6-dimethylphenol, 2,4-dimethylphenol and a combination thereof, and the bisphenol compound is selected from the group consisting of biphenol, bisphenol F, bisphenol A, p-thiobisphenol, bisphenol S and a combination thereof; and
mixing the phenol-formaldehyde novolac with an aromatic phosphate ester to undergo condensation and polymerization to produce a phosphorous-containing flame retarding phenol-formaldehyde novolac, wherein the aromatic phosphate ester is selected from the group consisting of DOPO (9,10-dihydro-9-oxa-10-phosphaphenanthrene-10-oxide), diphenyl phosphite ester, diphenyl phosphonate, C1-C4 alkyl group or C6-C18 aromatic group substituted thereof and a combination thereof.

3. The method of claim 2, wherein a mass ratio of the phenol compound and the bisphenol compound is ranged from 1:0.1 to 1:9.

4. An epoxy hardener comprising the phosphorous-containing flame retarding phenol-formaldehyde novolac of claim 1.

5. A method of producing a cured flame retarding epoxy resin, comprising:
reacting an epoxy resin with an epoxy hardener comprising the phosphorous-containing flame retarding phenol-formaldehyde novolac of claim 1.

6. The method of claim 5, further comprising controlling a weight ratio of the epoxy resin to the phosphorous-containing flame retarding phenol-formaldehyde novolac such that the cured flame retarding epoxy resin has a phosphorous weight percent of 0.5% to 10%.

7. The method of claim 5, wherein the epoxy hardener further comprises a component selected from the group consisting of phenol-formaldehyde novolac, cresol-formaldehyde novolac, bisphenol A phenol-formaldehyde novolac, dicyandiamide, methylenedianiline, diaminodiphenyl sulfone and the combination thereof.

8. The method of claim 5, wherein the epoxy resin is a difunctional epoxy resin or a polyfunctional epoxy resin selected from the group consisting of bisphenol A novolac epoxy, bisphenol F novolac epoxy, bisphenol S novolac epoxy, biphenol novolac epoxy, phenol novolac epoxy, cresol novolac epoxy, bisphenol A novolac epoxy and the combination thereof.

9. The method of claim 5, wherein the reaction is carried out in the presence of a curing accelerator, wherein the curing accelerator is a imidazole compound comprising 2-methylimidazole, 2-phenylimidazole or 2-ethyl-4-methylimidazole, and the curing accelerator is used in a range of 0.01 to 2.5 weight percent of the total weight of the epoxy resin and the epoxy hardener.

10. A resin used in a printed circuit board or in a semiconductor package, the resin comprising the reaction product of an epoxy resin and an epoxy hardener comprising the phosphorous-containing flame retarding phenol-formaldehyde novolac of claim 1.

* * * * *